United States Patent [19]

Funai

[11] Patent Number: 4,599,649
[45] Date of Patent: Jul. 8, 1986

[54] SYNCHRONOUS CIRCUIT
[75] Inventor: Tetsuro Funai, Osaka, Japan
[73] Assignee: Funai Electric Company Limited, Daito, Japan
[21] Appl. No.: 586,693
[22] Filed: Mar. 6, 1984
[30] Foreign Application Priority Data
  Nov. 4, 1983 [JP] Japan ................................. 58-207730
[51] Int. Cl.⁴ ............................................... H04N 5/04
[52] U.S. Cl. ..................................... 358/148; 358/149
[58] Field of Search ............... 358/148, 149, 150, 158, 358/159; 328/63, 179, 187; 331/20, 145, 149, 153, 172; 340/814; 273/DIG. 28; 375/116, 119

[56] References Cited
U.S. PATENT DOCUMENTS
4,517,587 5/1985 Aizawa et al. ...................... 358/150

Primary Examiner—James J. Groody
Assistant Examiner—Michael D. Parker
Attorney, Agent, or Firm—Fisher, Christen & Sabol

[57] ABSTRACT

A synchronous circuit useful for video games and the like is employed to coincide an external video signal in synchronization with an internally-generated video signal. The external signal may be produced by a laser disc playing device, or by other devices. The synchronous circuit reduces the time period for synchronization and eliminates jitter on the external synchronizing signal. A flip-flop circuit element is employed, together with a horizontal synchronizing signal counter having a cycle period somewhat smaller than that of an external horizontal synchronizing signal. The flip-flop circuit element is connected at one input terminal to an output stage of a counter output through a reset line.

1 Claim, 2 Drawing Figures

SYNCHRONOUS CIRCUIT

BACKGROUND OF THE INVENTION

This invention relates to a synchronous circuit used for coinciding an external video signal from, for example, a laser disc, in synchronization with a video signal generated by an internal computer.

Generally, game machines or the like use the external video signals from the laser disc or the like and the internal video signals generated by the computer, in which images, as well-known, are turbulent unless both these signals perfectly coincide with each other.

Conventionally, in order to synchronize such both signals with each other, for example, a PLL (phase-locked-loop): the so-called phase synchronous circuit following-up phase of input signal, has been used, which is defective in that it takes much time to synchronize such circuit.

SUMMARY OF THE INVENTION

In the light of the above problem, this invention has been designed. An object of the invention is to reduce the time period for synchronization and eliminate the effect of jitter on the external synchronizing signal.

A synchronous circuit of the invention is so constructed that an input terminal for an external horizontal synchronizing signal is connected to the S terminal of a flip-flop, the output stage thereof is connected to one input terminal at an AND circuit, an oscillator is connected to the other input terminal at the AND circuit, a horizontal synchronizing signal counter is connected to the output stage of the AND circuit, the output stage of the counter is connected to the R terminal of the flip-flop through a reset line and to an internal horizontal synchronizing signal line, and the cycle period of the counter is set somewhat smaller than that of an external horizontal synchronizing signal, so that at a time somewhat earlier than the time period where a second shot of an external horizontal synchronizing signal is given to the horizontal synchronizing signal counter from a first shot of the external horizontal synchronizing signal, the input of the second shot external horizontal synchronizing signal is delayed and the internal horizontal synchronizing signal is generated simultaneously with the input of the second shot external horizontal synchronizing signal, thereby synchronizing the external horizontal synchronizing signal with the internal horizontal synchronizing signal, resulting in that a time lag corresponding to a difference between the cycle periods of external horizontal synchronizing signal and horizontal synchronizing signal counter is used to eliminate the effect of jitter caused by the external horizontal synchronizing signal.

Next, an embodiment of a synchronous circuit of the invention will be detailed in accordance with the drawings.

DETAILED DESCRIPTION OF THE INVENTION

Figure 1:
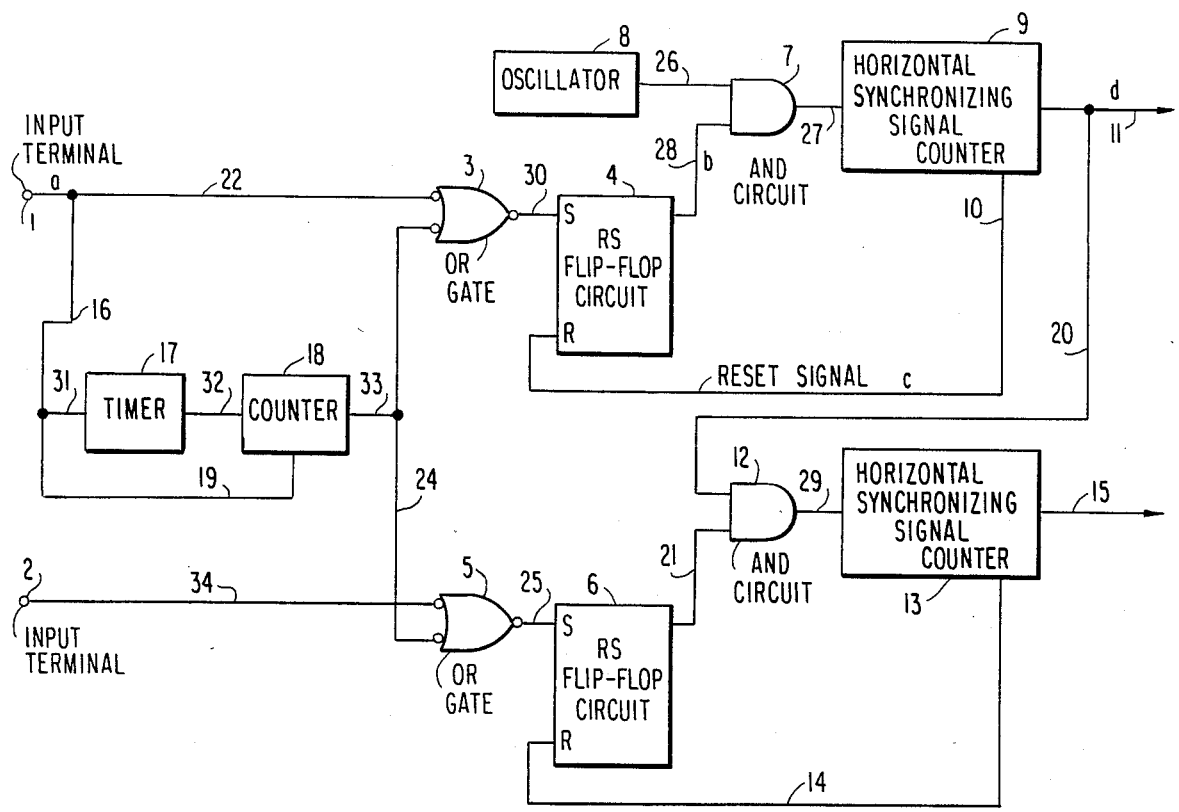
FIG. 1 is a schematic electric circuit diagram of a synchronous circuit according to the present invention.

FIG. 1 is an electric circuit diagram showing the embodiment of the synchronous circuit of the invention, in which 1 is an input terminal which is given a horizontal synchronizing signal (a) from an external instrument, such as a laser disc, and 2 is an input terminal given an external vertical synchronizing signal. The period of the external horizontal synchronizing signal (a) is 64.5 $\mu$s.

The input terminal 1 is connected by a first branch line 22 to an input terminal of a first negative logic OR gate 3. The output of the negative logic OR gate 3 is in turn connected by a line 30 to an S terminal of a first flip-flop circuit 4. Similarly, the input terminal 2 for the vertical synchronizing signal is connected by a line 34 to an input terminal of a negative logic OR gate 5. The output of the negative logic OR gate 5 is in turn connected by a line 25 to an S terminal of a flip-flop circuit 6.

Also, the output stage of the first flip-flop circuit 4, carrying a signal (b), is connected to one input terminal of an AND circuit 7 by a line 28. The other input terminal of the AND circuit 7 receives a signal from an oscillator 8 having an oscillation frequency of 18.432 MHZ. The output of the oscillator 8 is connected to the AND circuit 7 by a line 26.

Furthermore, a horizontal synchronizing signal counter 9 receives a signal from the output stage of the AND circuit 7. The cycle period of the counter 9 is set to 62.5 $\mu$s, which is somewhat shorter than that of the external horizontal synchronizing signal (a), that is, 64.5 $\mu$s.

The output stage of the counter 9 is connected to the R terminal of flip-flop circuit 4 through a reset line 10 and also to an internal horizontal synchronizing signal line 11, having a signal (d) carried by line 11.

On the other hand, the output stage of the second flip-flop circuit 6 is connected to one input terminal to a second AND circuit 12 by a line 21 and the other terminal is connected to the output stage of the counter 9 by a line 20.

A horizontal synchronizing signal counter 13 is connected to the output side of the second AND circuit 12 by a line 29, the cycle period of counter 13 being set to 16 ms, which is somewhat smaller than that of the external vertical synchronizing signal, which is 16.6 ms.

The output stage of the counter 13 is connected to the R terminal of the second flip-flop circuit 6 by a line 14 and also to an internal vertical synchronizing signal line 15.

A timer 17 having a cycle period of 62.5 $\mu$s is connected to the input terminal 1 from a branch line 16 along a line 31. A counter 18 is connected to the output stage of timer 17 by a line 32.

The counter 18 is adapted to generate an output signal only when a pulse signal to be given to the counter 18 is not given a plurality of times, for example for two pulses in continuation. In other words, the reset terminal of counter 18 is connected to the branch line 16 through a reset line 19. The output stage of the counter 18 is connected by a line 33 to the negative logic OR gates 3 and 5, by lines 23 and 24 respectively which branch from line 33 so that when the signal is not given continuously two times, the flip-flop circuit 4 is set to be kept in a free-run condition.

Next, explanation will be given on operation of the embodiment discussed in the foregoing.

Figure 2:
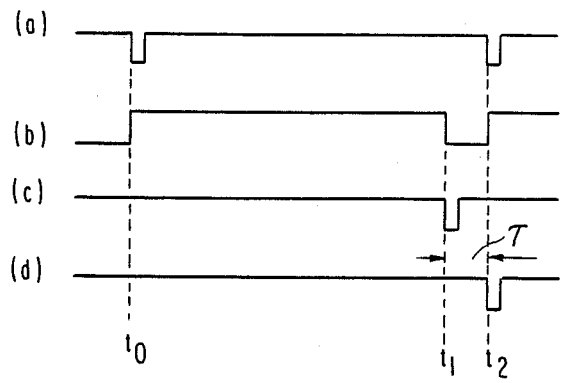
FIG. 2 shows wave form charts of the respective components of the circuit of FIG. 1.

Now, at the time $t_0$ in FIG. 2, the external horizontal synchronizing signal (a) (logically as the L signal), when given to the input terminal 1, is transmitted to the S terminal of flip-flop circuit 4 through the negative logic OR gate 3 and sets the flip-flop circuit 4, whereby the output line 28 carries a generated gate signal (logically as the H signal) as shown in FIG. 2 as signal (b).

Said H signal (b) and the H signal from oscillator 8 are logically combined with each other by the AND circuit 7 so that the output line 27 carries the H signal generated by AND circuit 7. The horizontal synchronizing counter 9 is then actuated by the output H signal from AND circuit 7 so as to send an output signal (c) to the line 10 which is a reset signal (logically as the L signal) when the cycle period of 62.5 $\mu$s is counted from the time of giving the H signal to the counter 9.

Therefore, the reset signal (c) resets the flip-flop circuit 4. Then the gate signal (b), i.e., the L signal, generated at the output stage of the flip-flop circuit 4, stops operation of the horizontal synchronizing signal counter 9, whereby the counter 9 is put in the waiting state from the time $t_1$ in FIG. 2.

Next, when the input terminal 1 is given the external horizontal synchronizing signal (the external L signal) at the second pulse at the time $t_2$ after the lapse of cycle period of 64.5 $\mu$s of the external horizontal synchronizing signal since the time $t_0$ in FIG. 2, the horizontal synchronizing signal counter 9, at the time $t_2$, outputs to the line 11 the internal horizontal synchronizing signal (L signal) as shown in FIG. 2 as signal (d), thereby coinciding the cycle period of external horizontal synchronizing signal (a) with that of the internal horizontal synchronizing signal (d).

Here, between the time $t_1$ and time $t_2$ in FIG. 2, in other words, with the time lag (64.5 $\mu$s $-$ 62.5 $\mu$s $=$ 2 $\mu$s) (see the reference arrows marked $\tau$ in FIG. 2) corresponding to a difference between the cycle periods of the external horizontal synchronizing signal (a) and of the horizontal synchronizing signal counter 9, the influence of jitter on the external horizontal synchronizing signal is eliminated.

The above description concerns the horizontal synchronizing signal. On the other hand, the vertical synchronizing signal beginning at input terminal 2 is different from the above only in the cycle period, but the same as the above in operation and effect, and therefore explanation of vertical synchronizing signal is unnecessary.

Next, explanation will be given of operation when the input terminal 1 is for some reason given no external horizontal input signal.

In a case where the input terminal 1 is properly given the signal, the external horizontal synchronizing signal (a) resets the counter 18 every pulse, but in a case where the input terminal 1 is not given the signal for some reason, the counter 18 is not reset. Therefore the signal sent to AND circuit 3 is generated by counter 18 when the output pulse from the timer 17 is counted two times, in other words, at the time when the external horizontal synchronizing signal is not given two times continuously, thereby leaving the flip-flop circuit 4 set through the negative logic OR gate 3 and causing the flip-flop circuit 4 to free-run.

Accordingly, even when some factor hinders the external horizontal synchronizing signal to be given from being fed properly, the internal circuit normally operates.

As above-mentioned, the synchronous circuit of the invention is so constructed that the input terminal 1 carries the external horizontal synchronizing signal (a). That signal is connected to the S terminal of flip-flop circuit 4, the output stage thereof being connected to one input terminal of the AND circuit 7, the other input terminal thereof being connected to the oscillator 8. The output stage of the AND circuit 7 is connected to the horizontal synchronizing signal counter 9, the output stage thereof being connected to the R terminal of the flip-flop circuit 4 through the reset line 10 and also to the internal horizontal synchronizing signal line 11. The cycle period of counter 9 is thereby set somewhat smaller than that of external horizontal synchronizing signal (a). Hence, the cycle period of the external horizontal synchronizing signal (a) coincides with that of internal horizontal synchronizing signal (d), whereby the synchronous circuit of the invention is advantageous in that even when applied to a game machine or the like, the circuit eliminates turbulence on images and can reduce the time period required for synchronization in comparison with the conventional synchronous circuit using PLL and moreover can eliminate the influence of jitter on the external horizontal synchronizing signal by means of the time lag ($\tau$) corresponding to the difference between the cycle periods of external horizontal synchronizing signal (a) and horizontal synchronizing signal counter.

The input terminal 2 receives an external vertical synchronizing signal. The subsequent circuit elements are respectively the same as for input terminal 1. However, an AND circuit 12 receives an input signal along line 20 from the counter 9, as opposed to the AND circuit 7 which receives a signal from an oscillator 8. The output signal from the counter 18 is split to line 24 as an input to the negative logic OR gate 5. The output of gate 5 is transmitted to the S terminal of a flip-flop circuit 6 along the line 25. The R terminal of the flip-flop 6 receives a reset signal along line 14 from a counter 13. The flip-flop circuit 6 sends its output signal along line 21 to an AND circuit 12. The other input to AND circuit 12 is from the counter 9 along line 20. The output of AND circuit 12 is carried by line 29 to a counter 13. The counter 13 sends an output signal along line 15 and a reset signal along line 14. The output signal along line 15 is an internal vertical synchronizing signal.

While a preferred embodiment of the present invention has been disclosed, it will be understood that it is not limited thereto but may be otherwise embodied within the scope of the following claim.

What is claimed is:

1. A synchronous circuit used to coincide an external video signal from a laser disc, for example, with a video signal generated by an internal computer characterized in that an input terminal 1 for an external horizontal synchronizing signal is connected to the S terminal of a R-S flip-flop circuit 4, an output stage of said R-S flip-flop circuit 4 is connected to one input terminal at an AND circuit 7, an oscillator 8 is connected to the other input terminal at said AND circuit 7, a horizontal synchronizing signal counter 9 is connected to the output stage of said AND circuit 7, and output stage of said counter 9 is connected to the R terminal at said R-S flip-flop circuit 4 through a reset line 10 and to an internal horizontal synchronizing signal line 11, and a cycle period of said counter 9 is set somewhat smaller than that of said external horizontal synchronizing signal.

* * * * *